United States Patent
Choi et al.

(10) Patent No.: US 7,450,178 B2
(45) Date of Patent: Nov. 11, 2008

(54) DISPLAY SYNCHRONIZATION SIGNAL GENERATOR IN DIGITAL BROADCAST RECEIVER

(75) Inventors: Young-hun Choi, Yongin-si (KR); Byeong-jin Kim, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 768 days.

(21) Appl. No.: 10/933,394

(22) Filed: Sep. 3, 2004

(65) Prior Publication Data

US 2005/0057690 A1 Mar. 17, 2005

(30) Foreign Application Priority Data

Sep. 17, 2003 (KR) .................. 10-2003-0064571

(51) Int. Cl.
*H04N 5/04* (2006.01)

(52) U.S. Cl. ..................................... 348/537

(58) Field of Classification Search ............... 348/537, 348/538, 540, 505, 547, 516, 521, 524, 511; 375/555, 327

See application file for complete search history.

(56) References Cited

U.S. PATENT DOCUMENTS

| | | | |
|---|---|---|---|
| 5,668,594 A * | 9/1997 | Cahill, III | 348/194 |
| 5,721,570 A | 2/1998 | Tsunoda et al. | |
| 5,767,917 A | 6/1998 | Gornstein et al. | |
| 5,936,968 A | 8/1999 | Lyons | |
| 6,316,974 B1 * | 11/2001 | Taraci et al. | 327/147 |
| 6,356,212 B1 | 3/2002 | Lyons et al. | |
| 6,356,567 B2 | 3/2002 | Anderson et al. | |
| 6,441,658 B1 * | 8/2002 | Taraci et al. | 327/147 |
| 6,493,034 B1 * | 12/2002 | Elberbaum | 348/512 |
| 6,538,656 B1 | 3/2003 | Cheung et al. | |
| 6,573,946 B1 * | 6/2003 | Gryskiewicz | 348/600 |
| 6,943,844 B2 * | 9/2005 | Cahill, III | 348/537 |
| 7,277,133 B2 * | 10/2007 | Cahill, III | 348/537 |

FOREIGN PATENT DOCUMENTS

| | | |
|---|---|---|
| EP | 0 487 072 A2 | 5/1992 |
| JP | 10-056582 A | 2/1998 |
| JP | 11-177653 A | 7/1999 |
| JP | 2001-257664 A | 9/2001 |
| JP | 2002-15527 A | 1/2002 |
| KR | 10-0194184 B1 | 2/1999 |

(Continued)

*Primary Examiner*—Paulos M Natnael
(74) *Attorney, Agent, or Firm*—Sughrue Mion, PLLC (57) ABSTRACT

A display synchronization signal generator capable of displaying a stable image regardless of changes in a transmission speed of a received digital broadcast signal in a digital broadcast receiver. The display synchronization signal generator includes a speed difference detector, a vertical period change amount detector, a vertical synchronization signal generator, a pixel clock signal generator, and a horizontal synchronization signal generator. The vertical period change amount detector detects a change amount in a vertical period of an image to be displayed, based on a detected speed difference. The vertical synchronization signal generation unit generates a vertical synchronization signal with a period that is changed based on the change amount detected by the vertical period change amount detector. The pixel clock signal generator generates a pixel clock signal based on a basic clock signal. The horizontal synchronization signal generator generates a horizontal synchronization signal in response to the pixel clock signal.

17 Claims, 4 Drawing Sheets

FOREIGN PATENT DOCUMENTS

| | | |
|---|---|---|
| KR | 1999-0063287 A | 7/1999 |
| KR | 2000-0042287 A | 7/2000 |
| KR | 10-0303723 B1 | 7/2001 |
| KR | 2001-0093934 A | 10/2001 |
| WO | WO 96/12374 A1 | 4/1996 |
| WO | WO 03/043341 A1 | 5/2003 |

* cited by examiner

DISPLAY SYNCHRONIZATION SIGNAL GENERATOR IN DIGITAL BROADCAST RECEIVER

CROSS REFERENCE TO RELATED APPLICATION

This application claims priority from Korean Patent Application No. 2003-64571, filed on Sep. 17, 2003, in the Korean Intellectual Property Office, the disclosure of which is hereby incorporated by reference in its entirety.

BACKGROUND OF THE INVENTION

1. Field of the Invention

The present invention relates to a display synchronization signal generator in a digital broadcast receiver, and more particularly, to a synchronization signal generator capable of displaying a stable image regardless of a transmission speed of a received broadcast signal in a digital broadcast receiver.

2. Description of the Related Art

The main purpose of digital broadcasting is to provide users with video and audio of higher quality than analog broadcasting and to provide more functions to users by supporting bi-directional communications with the users. The digital broadcasting is transferred to a digital broadcast receiver via a ground wave, satellite, or cable in the form of a motion picture experts group (MPEG)-transport stream (TS).

The MPEG-TS includes video and audio information for a plurality of programs and additional information required for broadcasting. When the conventional digital broadcast receiver receives the MPEG-TS, it selects a channel and a program by carrying out MPEG decoding, divides audio and video signals from the selected program, and outputs the divided audio and video signals. At this time, a transmission speed of the MPEG-TS and a system clock signal used in MPEG decoding are linked to each other.

Thus, when the transmission speed of the MPEG-TS changes, a frequency of the system clock signal used in the MPEG decoding also changes. In other words, as the transmission speed of the MPEG-TS decreases, the frequency of the system clock signal used in the MPEG decoding also decreases, and as the transmission speed of the MPEG-TS increases, the frequency of the system clock signal used in MPEG decoding also increases. The transmission speed of the MPEG-TS may vary with broadcasting stations, programs, or properties of cameras.

In the digital broadcast receiver, a graphics processor manages video data to be output to a display device. A pixel clock signal is a reference clock signal of the graphics processor. The pixel clock signal is linked to the system clock signal used in the MPEG decoding. Thus, as the transmission speed of the MPEG-TS changes, frequencies of the system clock signal used in MPEG decoding and the pixel clock signal also change. If the frequency of the pixel clock signal changes, frequencies of a horizontal synchronization signal and a vertical synchronization signal that are used to output video data from the graphics processor also change.

The graphics processor reads video data stored in a memory by using the horizontal synchronization signal and the vertical synchronization signal and outputs the video data to a display device. Thus, if the frequencies of the horizontal synchronization signal and the vertical synchronization signal change, frequencies of a horizontal synchronization signal and a vertical synchronization signal of the video data output to the display device from the graphics processor also change.

However, a conventional flat panel display device is designed to operate with a horizontal synchronization signal at a fixed frequency. Therefore, if the video data in which the frequency of the horizontal synchronization signal changes is provided to the display device, abnormal states such as horizontal waves, backlight out, or color flickering result on a display screen. As a result, a stable image cannot be displayed.

SUMMARY OF THE INVENTION

A display synchronization signal generator is provided for displaying a stable image regardless of a transmission speed of a received digital broadcast signal in a digital broadcast receiver.

A display synchronization signal generator is provided for displaying a stable image by generating a pixel clock signal of a fixed frequency and a vertical synchronization signal that changes in response to a transmission speed of a received digital broadcast signal in a digital broadcast receiver.

A display synchronization signal generator is provided for displaying a stable image by generating a horizontal synchronization signal of a fixed frequency and a vertical synchronization signal that changes in response to a transmission speed of a received digital broadcast signal in a digital broadcast receiver.

According to an exemplary embodiment of the present invention, there is provided a display synchronization signal generator including: a pixel clock signal generator, which generates a pixel clock signal based on a basic clock signal; and a horizontal synchronization signal generator, which generates a horizontal synchronization signal of a to-be-displayed image in response to the pixel clock signal.

According to another exemplary embodiment of the present invention, there is provided a display synchronization signal generator including a speed difference detector, a vertical period change amount detector, a vertical synchronization signal generator, a pixel clock signal generation unit, and a horizontal synchronization signal generator. The speed difference detector detects a speed difference between a transmission speed of a received broadcast signal and a decoding speed of the received broadcast signal. The vertical period change amount detector detects a change amount in a vertical period of an image to be displayed based on the speed difference. The vertical synchronization signal generator generates a vertical synchronization signal with a period that is changed based on the change amount in the vertical period. The pixel clock signal generation unit generates a pixel clock signal based on a basic clock signal. The horizontal synchronization signal generator generates a horizontal synchronization signal for the to-be-displayed image in response to the pixel clock signal.

According to still another exemplary embodiment of the present invention, there is provided a display synchronization signal generator in a digital broadcast receiver that includes a decoding unit for decoding a received broadcast signal and a display device. The display synchronization signal generator is included in the decoding unit and includes a speed difference detector, a vertical period change amount detector, a vertical synchronization signal generator, a pixel clock signal generator, and a horizontal synchronization signal generator. The speed difference detector detects a speed difference between a transmission speed of the received broadcast signal and a decoding speed of the received broadcast signal. The vertical period change amount detector detects a change amount in a vertical period of an image to be displayed on the display device based on the speed difference. The vertical synchronization signal generator generates a vertical synchronization signal with a period that is changed based on the change amount in the vertical period and outputs the generated vertical synchronization signal to the display device. The pixel clock signal generator generates a pixel clock signal based on a basic clock signal. The horizontal synchronization signal generator generates a horizontal synchronization signal in response to the pixel clock signal and outputs the generated horizontal synchronization signal to the display device.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE ILLUSTRATIVE, NON-LIMITING EMBODIMENTS OF THE INVENTION

The exemplary embodiments of the present invention will now be described more fully with reference to the accompanying drawings. Throughout the drawings, like reference numerals are used to refer to like elements.

Figure 1:
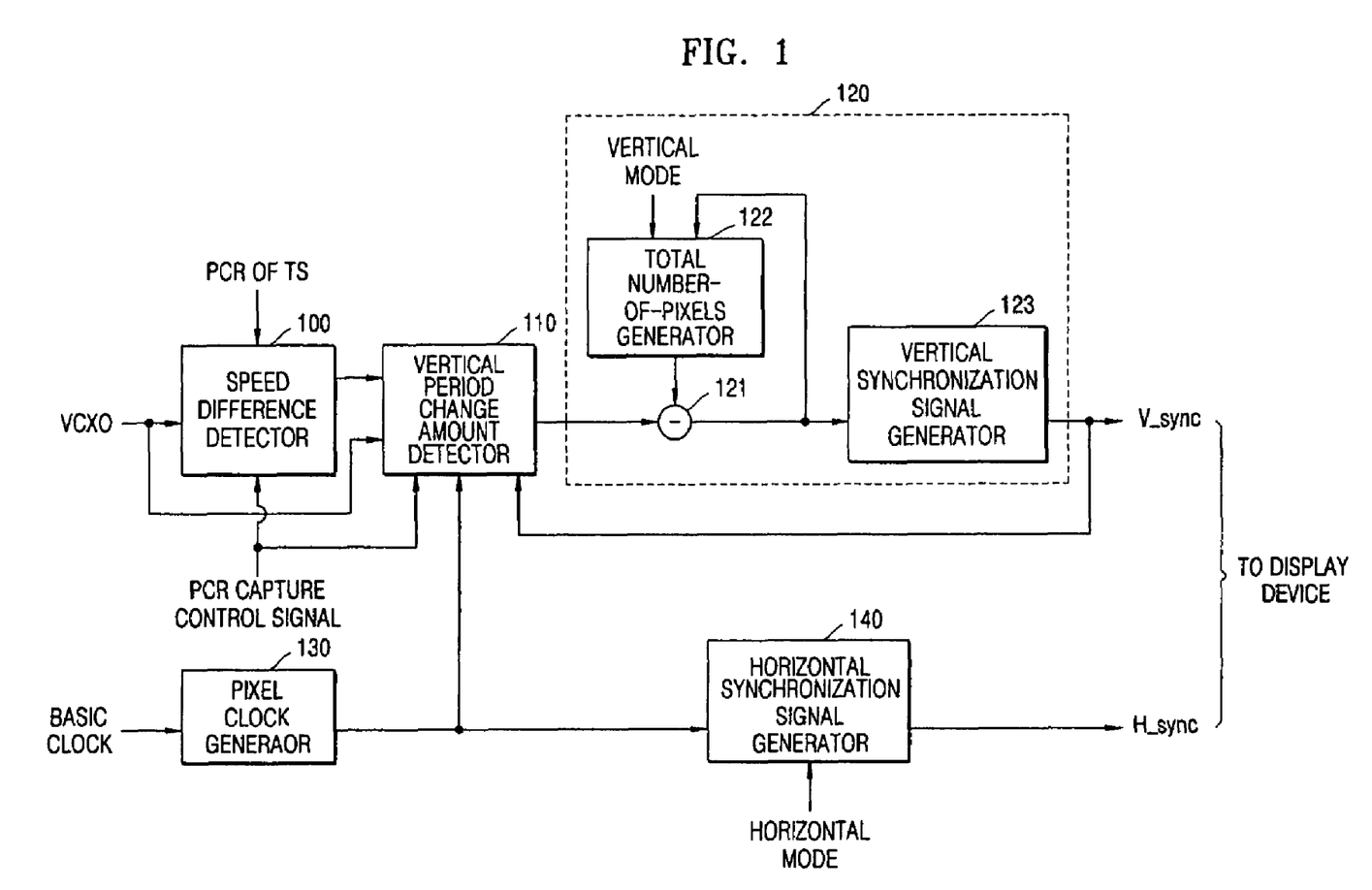
FIG. 1 is a block diagram of a display synchronization signal generator according to an exemplary embodiment of the present invention.

FIG. 1 is a block diagram of a display synchronization signal generator according to an exemplary embodiment of the present invention.

Referring to FIG. 1, the display synchronization signal generator includes a speed difference detector 100, a vertical period change amount detector 110, a vertical synchronization signal generator 120, a pixel clock signal generator 130, and a horizontal synchronization signal generator 140.

The speed difference detector 100 detects a difference between a transmission speed of a received broadcast signal and a decoding speed of the received broadcast signal by using program clock signal reference (PCR) data of a received TS and a PCR capture control signal.

Figure 2:
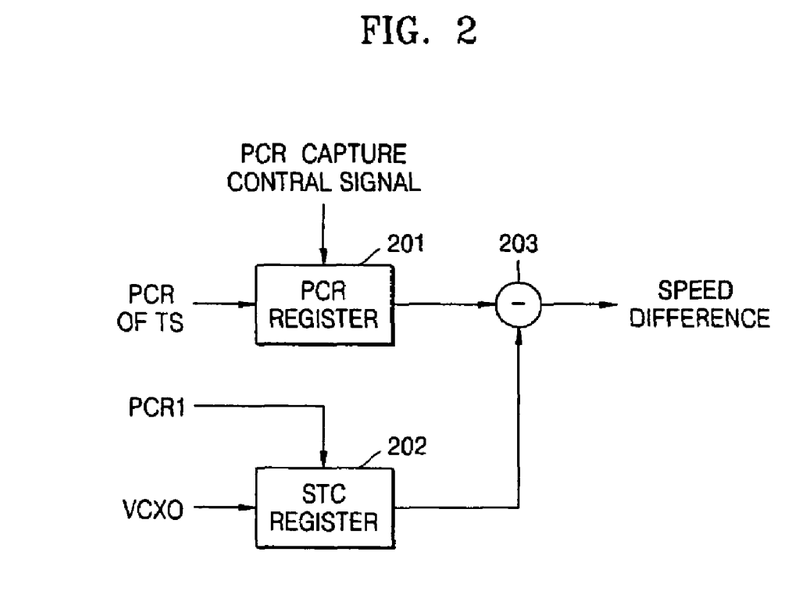
FIG. 2 is a detailed block diagram of a speed difference detector of FIG. 1.

To this end, the speed difference detector 100 includes a PCR register 201, a system time clock signal (STC) register 202, and a subtractor 203, as shown in FIG. 2.

The PCR register 201 extracts the PCR data of the received TS according to the PCR capture control signal and stores the PCR data. The PCR data contains information indicating how many times a packet in a selected program has been transmitted. This information is periodically incorporated into the PCR data. For example, if the information is incorporated into the PCR data every 0.5 seconds, the PCR capture control signal is input to the PCR register 201 every 0.5 seconds.

After a channel and a program of the received broadcast signal are selected, the STC register 202 stores PCR data PCR1 of a first received packet and updates stored data by increasing the stored data by 1 according to a system clock signal used in decoding the received broadcast signal. In FIG. 1, the system clock signal used in decoding the received broadcast signal is a voltage controlled crystal oscillator (VCXO) signal which has a frequency of 27 MHz.

The subtractor 203 detects a difference between data stored in the PCR register 201 and data stored in the STC register 202 and outputs the difference as the speed difference between the transmission speed of the received broadcast signal and the decoding speed of the received broadcast signal.

The vertical period change amount detector 110 detects a change amount for a vertical period of an image to be displayed based on the speed difference detected by the speed difference detector 100. To this end, the vertical period change amount detector 110 uses the speed difference, the system clock signal VCXO used in decoding the received broadcast signal, the PCR capture control signal, and a vertical synchronization signal.

Figure 3:
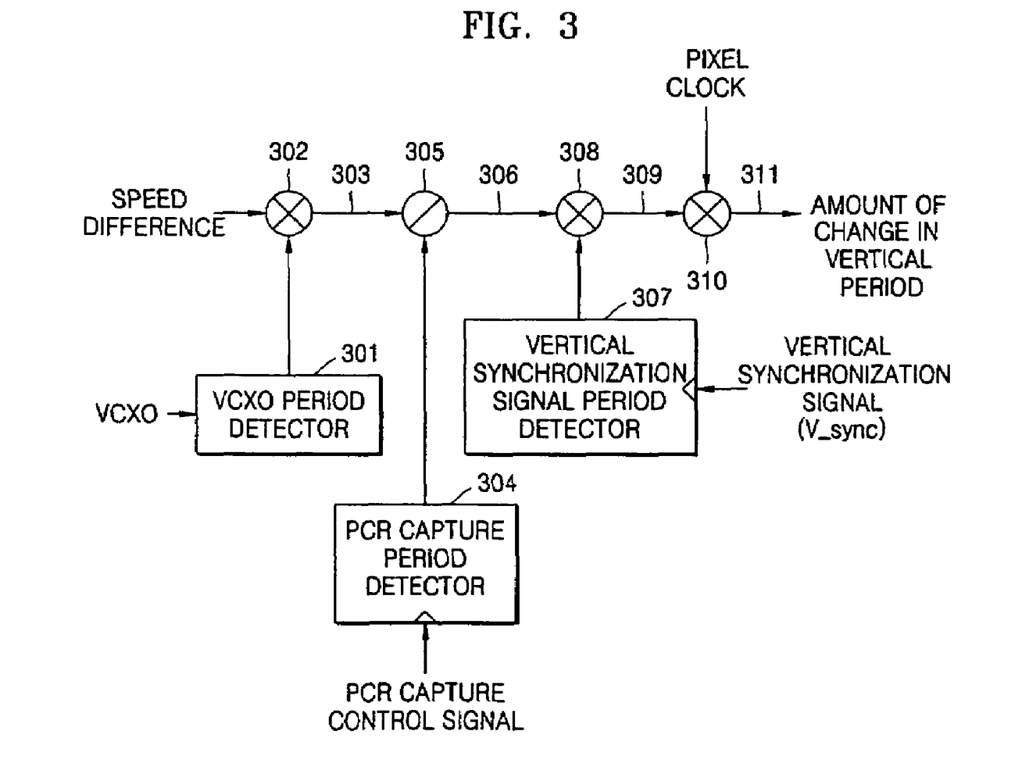
FIG. 3 is a detailed block diagram of a vertical period change amount detector of FIG. 1.

The vertical period change amount detector 110 includes a VCXO period detector 301, a plurality of multipliers 302, 308, and 310, a PCR capture period detector 304, a vertical synchronization signal period detector 307, and a divider 305, as shown in FIG. 3.

Referring to FIG. 3, the VCXO period detector 301 includes a timer and detects a period of the system clock signal VCXO. The period of the system clock signal VCXO is equal to the decoding period of the received broadcast signal. The multiplier 302 multiplies the speed difference by the period of the system clock signal VCXO and outputs a result of multiplication. Thus, the speed difference that is converted into a time value is transmitted via a line 303.

The PCR capture period detector 304 includes a timer and detects a PCR capture period. The divider 305 divides the speed difference, which is input via the line 303, by the PCR capture period and outputs a result of division. Thus, the speed difference, which is converted into a time per second, is transmitted through a line 306.

Therefore, the VCXO period detector 301, the multiplier 302, the PCR capture period detector 304, and the divider 305 convert the speed difference into a time.

The vertical synchronization signal period detector 307 includes a timer and detects a period of an input vertical synchronization signal. The multiplier 308 multiplies the speed difference input via the line 306 by the period of the vertical synchronization signal. Thus, a speed difference per frame, which is converted into a time, is transmitted via a line 309. Therefore, the vertical synchronization signal period detector 307 and the multiplier 308 converts the speed difference into the speed difference per frame.

The multiplier 310 multiplies the speed difference per frame input via the line 309 by a pixel clock signal generated by the pixel clock signal generator 130. Thus, the change amount in a vertical period that is converted into a pixel unit is transmitted via a line 311. Therefore, the multiplier 310 converts the speed difference per frame into the change amount in the vertical period in a pixel unit.

The vertical synchronization signal generator 120 generates a vertical synchronization signal with a period that depends on the amount of change in the vertical period detected as a vertical synchronization signal of a to-be-displayed image by the vertical period change amount detector 110. To this end, the vertical synchronization signal generation unit 120 includes a calculator 121, a total number-of-pixels generator 122, and a vertical synchronization signal generator 123.

The calculator 121 changes a total number of pixels per frame output from the total number-of-pixels generator 122 by the change amount in the vertical period output from the vertical period change amount detector 110 and outputs the recalculated total number of pixels per frame. In FIG. 1, the calculator 121 is a subtractor. However, the calculator 121 may be an adder because the recalculated total number of pixels output from the calculator 121 may be smaller or larger than the total number of pixels output from the total number-of-pixels generator 122, according to the amount of change in the vertical period output from the vertical period change amount detector 110.

The total number-of-pixels generator 122 stores and generates the total number of pixels per frame. The total number-of-pixels generator 122 initially generates the total number of pixels per frame, which is determined according to a preset vertical mode. When the recalculated total number of pixels per frame is output from the calculator 121, the stored total number of pixels per frame is updated to the recalculated total number of pixels per frame output from the calculator 121 and generates the recalculated total number of pixels per frame. The vertical mode may be set using V-total or may be programmable by user. V-total is the total number of lines per frame including lines assigned to V addressable, V bottom border, V Odd field, V sync, V Even field, and V top border.

The vertical synchronization signal generator 123 generates a vertical synchronization signal V_sync for an image to be displayed, based on the recalculated total number of pixels per frame output from the calculator 121.

The pixel clock signal generator 130 generates the pixel clock signal based on a preset basic clock signal. The generated pixel clock signal has a frequency that satisfies the operating condition of a display device (not shown).

Figure 4:
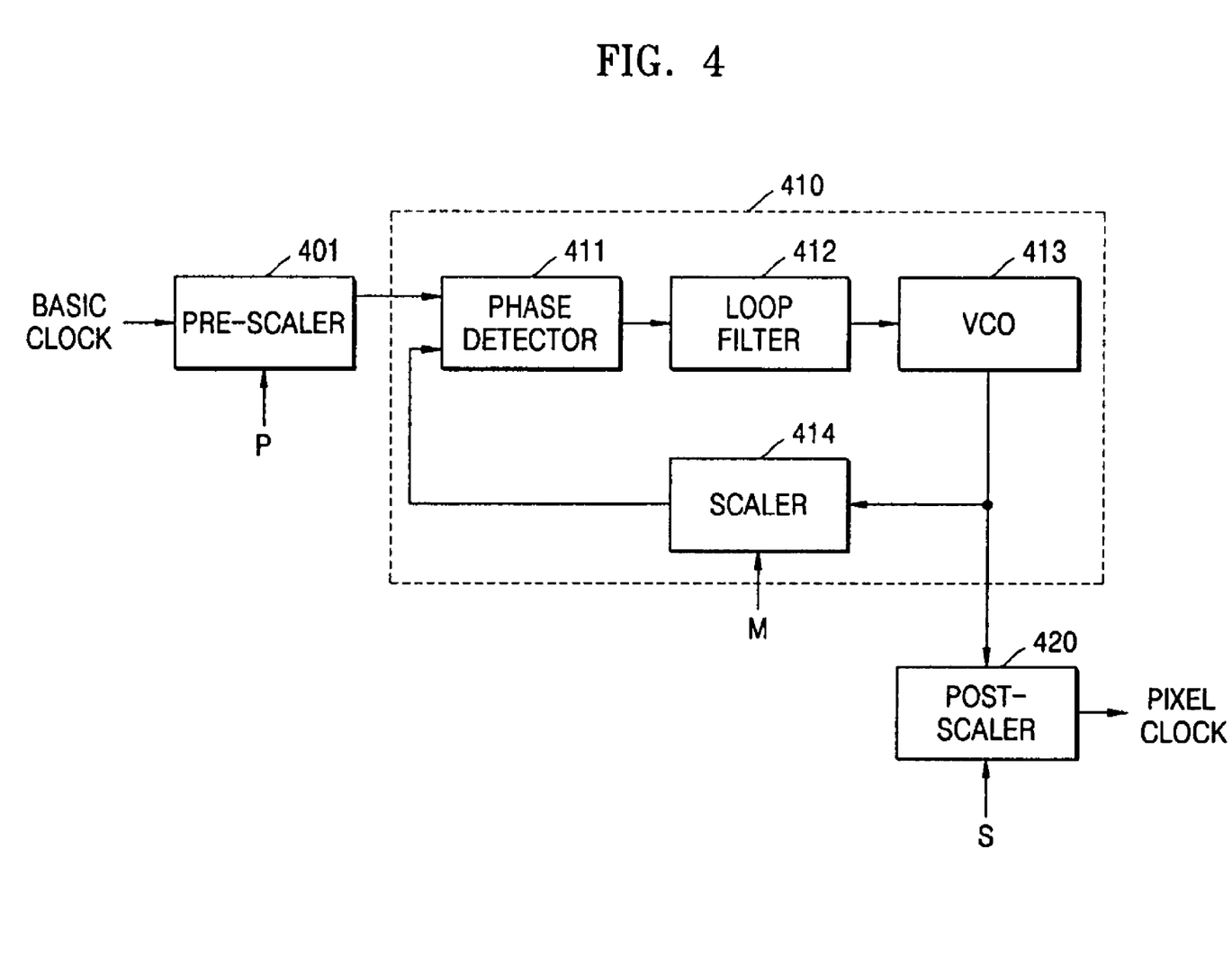
FIG. 4 is a detailed block diagram of a pixel clock signal generator of FIG. 1.

The pixel clock signal generator 130 carries out multiple scaling for the preset basic clock signal to generate a pixel clock signal of a desired frequency. Referring to FIG. 4, the pixel clock signal generator 130 includes a pre-scaler 401, a phase locked loop 410, and a post-scaler 420.

The pre-scaler 401 scales an input basic clock signal by using a first scaling coefficient P. The pre-scaler 401 may be implemented as a divider.

The phase locked loop 410 maintains phase lock between a scaled basic clock signal output from the pre-scaler 401 and an output signal scaled using a second scaling coefficient M.

The phase locked loop 410 includes a phase detector 411, a loop filter 412, a voltage controlled oscillator (VCO) 413, and a scaler 414. The phase detector 411 detects a phase difference between the scaled basic clock signal output by the pre-scaler 401 and the output signal scaled using the second scaling coefficient M by the scaler 414. The loop filter 412 outputs a control voltage in which a frequency component of an input phase difference is limited. The VCO 413 generates the output signal that oscillates at a frequency corresponding to the control voltage output from the loop filter 412. The output signal is phase-locked to a signal output from the pre-scaler 401. The frequency of the output signal generated by the VCO 413 is provided to the scaler 414. The scaler 414 scales the output signal using the second scaling coefficient M and outputs the scaled output signal.

The post-scaler 420 scales the output signal output from the VCO 413 of the phase locked loop 410 using a third scaling coefficient S and outputs a scaled result as the pixel clock signal.

The basic clock signal, the first scaling coefficient P, the second scaling coefficient M, and the third scaling coefficient S may be programmable. Also, to accurately generate the pixel clock signal with the frequency that satisfies the operating condition of the display device, the basic clock signal, the first scaling coefficient P, the second scaling coefficient M, and the third scaling coefficient S may be set based on the operating condition of the display device.

The pixel clock signal output from the post-scaler 420 is transmitted to the vertical period change amount detector 110 and the horizontal synchronization signal generator 140.

Based on a preset horizontal mode, the horizontal synchronization signal generation unit 140 generates a horizontal synchronization signal H_sync that depends on the input pixel clock signal, as a horizontal synchronization signal of an image to be displayed. The horizontal mode may be set using H-total. H-total is the total number of pixels per frame including pixels assigned to H addressable, H right border, H front porch, H sync, H back porch, and H left border.

Figure 5:
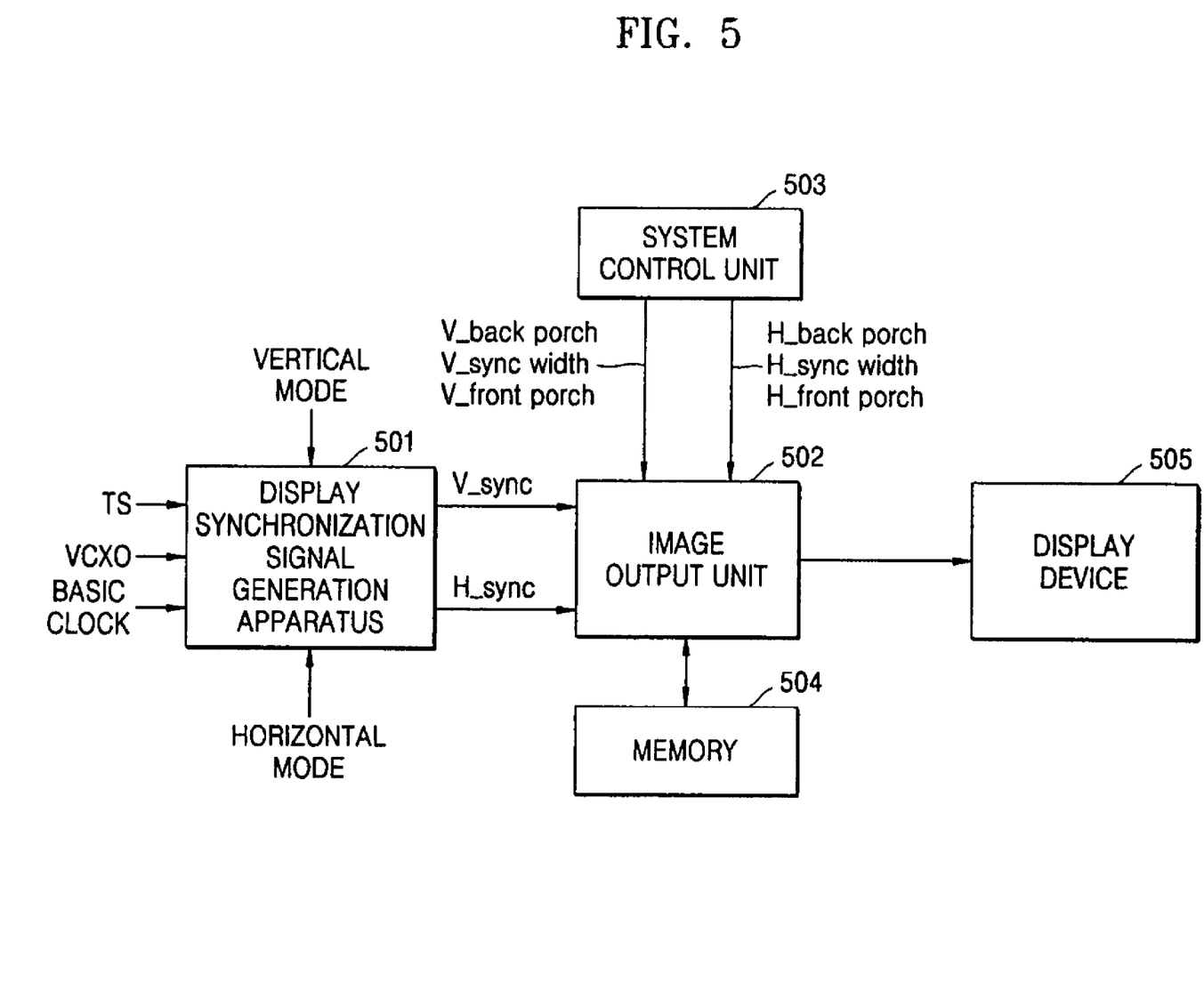
FIG. 5 is a block diagram of a digital broadcast receiver including the display synchronization signal generator of FIG. 1.

FIG. 5 is a block diagram of a digital broadcast receiver including the display synchronization signal generator of FIG. 1. When the vertical synchronization signal V_sync and the horizontal synchronization signal H_sync are generated by the synchronization signal generator 501, an image output unit 502 reads video data stored in a memory 504 by using horizontal and vertical timing signals V_back porch, V_sync width, V_front porch, H_back porch, H_sync width and H_front porch that are provided by a system control unit 503, and the horizontal synchronization signal H_sync and the vertical synchronization signal V_sync and outputs the read video data to a display device 505.

The synchronization signal generator 501 may be built in an MPEG decoding integrated chip included in the digital broadcast receiver.

As described above, according to an exemplary embodiment of the present invention, when a frequency of a system clock signal used in MPEG decoding is changed due to a change in a transmission speed of a digital broadcast signal, a frequency of a horizontal synchronization signal, which is used to display an image, is fixed by fixing a frequency of a pixel clock signal. Thus, it is possible to prevent abnormal states of a display screen such as horizontal waves, backlight out, or color flickering and output a stable image regardless of the change in the transmission speed of the digital broadcast signal.

Also, the vertical synchronization signal used for displaying an image is generated with a frequency that changes with the transmission speed of the digital broadcast signal. Thus, it is possible to prevent skipping and repetition of an image and output a stable image regardless of the change in the transmission speed of the digital broadcast signal.

When the display synchronization signal generator according to the exemplary embodiment of the present invention is built in an MPEG decoding integrated chip included in a digital broadcast receiver, an image with optimal quality can be displayed when digital broadcasting is received.

While the present invention has been particularly shown and described with reference to an exemplary embodiment thereof, it will be understood by those of ordinary skill in the art that various changes in form and details may be made therein without departing from the spirit and scope of the invention as defined by the appended claims and their equivalents.

What is claimed is:

1. A display synchronization signal generator comprising:
   a pixel clock signal generator, which generates a pixel clock signal based on a basic clock signal which is independent of a reference clock signal; and
   a horizontal synchronization signal generator, which generates a horizontal synchronization signal of a to-be-displayed image in response to the pixel clock signal.

2. The display synchronization signal generator of claim 1, wherein the pixel clock signal has a frequency that satisfies an operating condition of a display device to which the to-be-displayed image is output.

3. The display synchronization signal generator of claim 2, wherein the pixel clock signal generator is configured to perform multiple scaling.

4. A display synchronization signal generator comprising:
a pixel clock signal generator, which generates a pixel clock signal based on a basic clock signal; and
a horizontal synchronization signal generator, which generates a horizontal synchronization signal of a to-be-displayed image in response to the pixel clock signal, wherein the pixel clock signal generator comprises:
a pre-scaler, which scales the basic clock signal using a first scaling coefficient, thereby generating a scaled basic clock signal;
a phase locked loop, which maintains phase lock between the scaled basic clock signal and an output signal scaled using a second scaling frequency; and
a post-scaler, which scales a signal output from the phase locked loop using a third scaling coefficient and outputs the pixel clock signal.

5. The display synchronization signal generator of claim 4, wherein the basic clock signal, the first scaling coefficient, the second scaling coefficient, and the third scaling coefficient are programmable.

6. A display synchronization signal generator comprising:
a speed difference detector, which detects a speed difference between a transmission speed of a received broadcast signal and a decoding speed of the received broadcast signal;
a vertical period change amount detector, which detects a change amount in a vertical period of an image to be displayed based on the speed difference;
a vertical synchronization signal generator, which generates a vertical synchronization signal with a period that is changed based on the change amount in the vertical period;
a pixel clock signal generation unit, which generates a pixel clock signal based on a basic clock signal; and
a horizontal synchronization signal generator, which generates a horizontal synchronization signal for the to-be-displayed image in response to the pixel clock signal.

7. The display synchronization signal generator of claim 6, wherein the pixel clock signal has a frequency that satisfies an operating condition of a display device to which the to-be-displayed image is output.

8. The display synchronization signal generator of claim 6, wherein when the received broadcast signal is a transport stream, and the speed difference detector detects the speed difference by using program clock signal reference data of the transport stream.

9. The display synchronization signal generator of claim 8, wherein the speed difference detector comprises:
a system time clock signal register, which stores program clock signal reference data of a first received packet after a channel and a program of the received broadcast signal are selected, and updates stored data based on a decoding period of the received broadcast signal;
a program clock signal reference register, which captures and outputs program clock signal reference data of a received transport stream according to a program clock signal reference capture control signal; and
a subtractor, which detects a difference between data stored in the system time clock signal register and data stored in the program clock signal reference register and outputs the detected difference as the speed difference.

10. The display synchronization signal generator of claim 9, wherein the system time clock signal register increases the stored data by 1 based on the decoding period of the received broadcast signal.

11. The display synchronization signal generator of claim 6, wherein the vertical period change amount detector converts the change amount in the vertical period into a pixel unit by using the pixel clock signal.

12. The display synchronization signal generator of claim 11, wherein the first converter converts the speed difference into the time based on the decoding period of the received broadcast signal and converts the speed difference that is converted into the time into time per second based on a capturing period of the program clock signal reference data.

13. The display synchronization signal generator of claim 6, wherein the vertical period change amount detector comprises:
a first converter, which converts the speed difference into a time;
a second converter, which converts the speed difference that is converted into the time into a speed difference per frame based on a period of the vertical synchronization signal; and
a third converter, which converts the speed difference per frame output from the second converter into the change amount in the vertical period that is converted into the pixel unit by using the pixel clock signal.

14. The display synchronization signal generator of claim 6, wherein the vertical synchronization signal generator comprises:
a calculator, which calculates a total number of pixels per frame by the change detected by the vertical period change amount detector and outputs a calculated total number of pixels per frame;
a total number-of-pixels generator, which initially generates the total number of pixels per frame according to a preset vertical mode, updates the total number of pixels per frame to the calculated total number of pixels per frame output, and generates the calcualted total number of pixels per frame; and
a vertical synchronization signal generator, which generates a vertical synchronization signal for the to-be-displayed image based on the calculated total number of pixels.

15. The display synchronization signal generator of claim 6, wherein the pixel clock signal generator comprises:
a pre-scaler, which scales the basic clock signal by using a first scaling coefficient;
a phase locked loop, which maintains phase lock between the scaled basic clock signal and the output signal scaled using a second scaling coefficient;
a post-scaler, which scales a signal output from the phase locked loop using a third scaling coefficient; and
a pixel clock signal generator, which generates the pixel clock signal based on a signal output from the post-scaler.

16. The display synchronization signal generator of claim 15, wherein the basic clock signal, the first scaling coefficient, the second scaling coefficient, and the third scaling coefficient are programmable according to an operating condition of a display device to which the image to be displayed is output.

17. A display synchronization signal generator in a digital broadcast receiver that includes a decoding unit for decoding a received broadcast signal and a display device, wherein the display synchronization signal generator included in the decoding unit comprises:
- a speed difference detector, which detects a speed difference between a transmission speed of the received broadcast signal and a decoding speed of the received broadcast signal;
- a vertical period change amount detector, which detects a change amount in a vertical period of an image to be displayed on the display device based on the speed difference;
- a vertical synchronization signal generator, which generates a vertical synchronization signal with a period that is changed based on the change amount in the vertical period and outputs the generated vertical synchronization signal to the display device;
- a pixel clock signal generator, which generates a pixel clock signal based on a basic clock signal; and
- a horizontal synchronization signal generator, which generates a horizontal synchronization signal in response to the pixel clock signal and outputs the generated horizontal synchronization signal to the display device.

* * * * *